Patented Sept. 27, 1949

2,483,182

UNITED STATES PATENT OFFICE 2,483,182

COPOLYMERS OF VINYL FURANE AND CHLOROPRENE

Albert M. Clifford, Stow, Ohio, assignor to Wingfoot Corporation, Akron, Ohio, a corporation of Delaware No Drawing. Application March 17, 1947, Serial No. 735,245

4 Claims. (Cl. 260—87.5)

This invention relates to new polymeric compositions of matter having useful properties as hereinafter described, and, more particularly, to copolymeric masses prepared by the conjoint polymerization of vinyl furane with chloroprene.

In accordance with this invention, chloroprene and vinyl furane were copolymerized in aqueous emulsion in the presence of oxidizing catalysts and emulsion stabilizing agents. Suitable oxidizing catalysts for the practice of this invention are sodium perborate, hydrogen peroxide, sodium peroxide, sodium persulfate, benzoyl peroxide, ethyl percarbonate, per acid salts of other alkali metals and other organic peroxides and percarbonates. Suitable emulsion stabilizing agents for the practice of this invention are the alkali metal and ammonia salts of high molecular weight carboxylic acids, preferably those having 8 to 22 carbon atoms, the alkali metal and ammonium salts of rosin acids, and in general, any compound having both hydrophilic and hydrophobic radicals. Among the many useful materials for stabilizing the emulsion are the fatty acid soaps made by the saponification of vegetable and animal oils, the rosin soaps, the sodium alkyl sulfates, particularly those in which the alkyl group has between 8 and 22 carbon atoms, the sodium alkyl sulfonates, the various sulfonated hydrocarbons, the amino soaps, such as triethanolamine, and other agents known to stabilize aqueous emulsions.

The new copolymers may be prepared with as little as 5 percent of vinyl furane and as much as 95 percent, although in the preferred compositions the vinyl furane is used in an amount between 25 and 75 percent of the entire copolymer. The chloroprene will also vary between 5 and 95 percent and in the more desirable compounds will be present in amount between 25 and 75 percent. Tripolymers, and copolymers of 4 or more constituents may also be prepared by adding other compatible polymerizable olefinic compounds in small amounts. Suitable other olefinic compounds are styrene, vinylidene chloride, vinyl esters of fatty acids, such as vinyl acetate, maleic anhydride, acrylonitrile and alkyl esters of acrylic acid, chloroacrylic acid and methacrylic acid as methyl acrylate and methyl methacrylate.

The polymerizations may be conducted in any conventional emulsion polymerization apparatus. It is usually desirable to provide some means of agitating the reactants to induce a homogeneous copolymerization, and for this purpose a stirring device, a means for tumbling the container, or otherwise agitating the contents may be provided. To induce more rapid polymerization, it is usually desirable to heat the reaction mass to a temperature between 30 and 80° C., care being taken not to promote too rapid polymerization by means of excessive temperatures.

The new vinyl furane copolymers can be compounded and cured to give tough molded articles where oil and grease resistance are desired in rubber-like articles. Other applications where thermoplastic resins are required are contemplated.

Further details of the preparation of the new copolymers are set forth with respect to the following examples.

Example 1

Eight grams of vinyl furane and 4 grams of chloroprene were charged into a glass reaction vessel with 15 cc. of 3 percent sodium oleate in aqueous solution and 0.1 gram sodium perborate. The reaction vessels were maintained at 50° C. for 72 hours and vigorously tumbled throughout the entire reaction period. The emulsion polymers obtained upon opening the reaction vessel were coagulated with alcohol, washed and dried. A 99 percent yield of a very tough leathery composition was obtained.

Example 2

Using the procedure described in the preceding experiment, four grams of vinyl furane and 8 grams of chloroprene were copolymerized. A 92 percent yield of a soft pliable composition was obtained.

Example 3

Using the procedure defined in the preceding experiments copolymers of vinyl furane, chloroprene and vinylidene chloride were prepared. In the following table is set forth a description of the various copolymers obtained:

| Grams Chloroprene | Grams Vinylidene Chloride | Grams Vinyl Furane | Per Cent Yield | Remarks |
|---|---|---|---|---|
| 1.5 | 1.5 | 9.0 | 83 | Tough, thermoplastic. |
| 3.0 | 3.0 | 6.0 | 70 | Tough, resilient. |
| 6.0 | 3.0 | 3.0 | 68 | Relatively hard. |

This application is a continuation-in-part of application Serial No. 202,270, filed April 15, 1938 now abandoned, and application Serial No. 487,809, filed May 20, 1943, now Patent No. 2,419,057.

Although the invention has been described with respect to specific examples, it is not intended that the details thereof shall be construed as limitations upon the scope of this invention, except

I claim:
1. A copolymer of 5 to 95 percent by weight of vinyl furane and 95 to 5% chloroprene.
2. A copolymer of 25 to 75 percent by weight of vinyl furane and 75 to 25 percent of chloroprene.
3. A copolymer of two parts by weight of vinyl furane and one part of chloroprene.
4. A copolymer of from 1 part to 2 parts by weight of vinyl furane and from 2 parts to 1 part of chloroprene.

ALBERT M. CLIFFORD.

REFERENCES CITED

The following references are of record in the file of this patent:

UNITED STATES PATENTS

| Number | Name | Date |
|---|---|---|
| 1,911,722 | Sorenson | May 30, 1933 |
| 2,066,330 | Carothers et al. | Jan. 5, 1937 |
| 2,256,148 | Lichty | Sept. 16, 1941 |